US012211461B2

(12) United States Patent
Lee et al.

(10) Patent No.: US 12,211,461 B2
(45) Date of Patent: Jan. 28, 2025

(54) DISPLAY APPARATUS AND METHOD OF CONTROLLING THE SAME

(71) Applicant: SAMSUNG ELECTRONICS CO., LTD., Suwon-si (KR)

(72) Inventors: Dongki Lee, Suwon-si (KR); Jihye Kim, Suwon-si (KR); Changhoon Kim, Suwon-si (KR); Jeongphil Seo, Suwon-si (KR); Kyeongjin Lee, Suwon-si (KR); Sungjin Lim, Suwon-si (KR); Youngho Jung, Suwon-si (KR); Yujin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/214,935

(22) Filed: Jun. 27, 2023

(65) Prior Publication Data

US 2024/0096295 A1 Mar. 21, 2024

Related U.S. Application Data

(63) Continuation of application No. PCT/KR2023/008192, filed on Jun. 14, 2023.

(30) Foreign Application Priority Data

Sep. 19, 2022 (KR) ........................ 10-2022-0118223

(51) Int. Cl.
*G09G 3/36* (2006.01)

(52) U.S. Cl.
CPC ......... *G09G 3/3607* (2013.01); *G09G 3/3674* (2013.01)

(58) Field of Classification Search
CPC .......... G09G 3/20; G09G 3/32; G09G 3/3607; G09G 3/3674
See application file for complete search history.

(56) References Cited

U.S. PATENT DOCUMENTS 9,473,731 B2 10/2016 Kim et al.
10,674,112 B2 6/2020 Moon et al.
(Continued)

FOREIGN PATENT DOCUMENTS

KR 10-2013-0045656 A 5/2013
KR 10-2015-0077598 A 7/2015
(Continued)

OTHER PUBLICATIONS

International Search Report dated Oct. 12, 2023 in International Application No. PCT/KR2023/008192.
(Continued)

*Primary Examiner* — Sardis F Azongha
(74) *Attorney, Agent, or Firm* — Sughrue Mion, PLLC

(57) ABSTRACT

Provided is a display apparatus including: a liquid crystal panel; a source driver configured to output a grayscale voltage to the liquid crystal panel; a timing controller configured to transmit a source control signal to the source driver; a scaler configured to transmit image data corresponding to content received from an external source to the timing controller; and a controller configured to adjust a driving scan rate of the liquid crystal panel to correspond to a set scan rate of the content, and control at least one of the scaler or the timing controller to adjust a data rate of an output signal based on the driving scan rate.

18 Claims, 8 Drawing Sheets

(56) References Cited

U.S. PATENT DOCUMENTS

| | | | |
|---|---|---|---|
| 11,183,095 B2 | 11/2021 | Ranjan et al. | |
| 11,223,749 B1 * | 1/2022 | Lin | H04N 5/06 |
| 11,295,650 B2 | 4/2022 | Kim et al. | |
| 11,694,598 B2 | 7/2023 | Kim | |
| 11,798,508 B2 | 10/2023 | Jeong | |
| 11,854,475 B2 | 12/2023 | Chun | |
| 2013/0106810 A1 | 5/2013 | Kim et al. | |
| 2014/0333642 A1 | 11/2014 | Chiang et al. | |
| 2017/0110066 A1 * | 4/2017 | Luo | G09G 3/3406 |
| 2018/0048853 A1 * | 2/2018 | Koh | G09G 3/3688 |
| 2021/0201732 A1 | 7/2021 | Ranjan et al. | |
| 2021/0295770 A1 | 9/2021 | Chun et al. | |

FOREIGN PATENT DOCUMENTS

| | | | | |
|---|---|---|---|---|
| KR | 10-2020-0033084 A | | 3/2020 | |
| KR | 10-2021-0081867 A | | 7/2021 | |
| KR | 10-2304860 B1 | | 9/2021 | |
| KR | 10-2021-0142761 A | | 11/2021 | |
| KR | 10-2022-0039904 A | | 3/2022 | |
| KR | 10-2022-0088213 A | | 6/2022 | |
| KR | 10-2022-0116873 A | | 8/2022 | |
| TW | 202236250 A | * | 9/2022 | G09G 3/20 |

OTHER PUBLICATIONS

Written Opinion dated Oct. 12, 2023 in International Application No. PCT/KR2023/008192.

* cited by examiner

DISPLAY APPARATUS AND METHOD OF CONTROLLING THE SAME

CROSS-REFERENCE TO RELATED APPLICATION

This application is a bypass continuation of PCT International Application No. PCT/KR2023/008192 filed on Jun. 14, 2023, which claims priority to Korean Patent Application No. 10-2022-0118223, filed on Sep. 19, 2022 in the Korean Intellectual Property Office, the disclosures of which are incorporated herein by reference.

BACKGROUND

1. Field

The present disclosure relates to a display apparatus including a liquid crystal panel.

2. Description of the Related Art

A gaming display apparatus may implement a dynamic screen by varying a driving scan rate of a liquid crystal panel according to an input scan rate. For example, gaming display apparatuses may control a liquid crystal panel at a driving scan rate between 60 Hz and 240 Hz.

However, because general gaming display apparatuses may be used by setting all specifications at the maximum scan rate, the display apparatus may be controlled with the specifications set based on the maximum scan rate even when a low scan rate is input. Thus, the display apparatus may be driven with high power consumption even when a low scan rate is input.

SUMMARY

Disclosed is a display apparatus that minimizes power consumption by adjusting a data rate of a digital image signal transmitted between driving elements according to an input scan rate, and a method of controlling the same.

The technical objectives of the disclosure are not limited to the above, and other objectives may become apparent to those of ordinary skill in the art based on the following description.

According to an aspect of the disclosure, there is provided a display apparatus including: a liquid crystal panel; a source driver configured to output a grayscale voltage to the liquid crystal panel; a timing controller configured to transmit a source control signal to the source driver; a scaler configured to transmit image data corresponding to content received from an external source to the timing controller; and a controller configured to: adjust a driving scan rate of the liquid crystal panel to correspond to a set scan rate of the content; and control at least one of the scaler or the timing controller to adjust a data rate of an output signal based on the driving scan rate.

The controller may be further configured to control the at least one of the scaler or the timing controller to adjust the data rate of the output signal in proportion to the driving scan rate.

The controller may be further configured to, based on the set scan rate of the content being decreased, control the at least one of the scaler or the timing controller to decrease the data rate of the output signal.

The controller may be further configured to, based on the set scan rate of the content being increased, control the at least one of the scaler or the timing controller to increase the data rate of the output signal.

The controller may be further configured to control the at least one of the scaler or the timing controller to control the data rate of the output signal to be linearly proportional to the driving scan rate.

The controller may be further configured to control the at least one of the scaler or the timing controller to adjust the data rate of the output signal at each time of the content received from the external source being changed.

The controller may be further configured to control the at least one of the scaler or the timing controller to adjust the data rate of the output signal based on the driving scan rate in units of preset frame intervals.

The controller may be further configured to control the at least one of the scaler or the timing controller to adjust the data rate of the output signal based on the driving scan rate in units of preset time intervals.

According to an aspect of the disclosure, a method of controlling a display apparatus includes: adjusting a driving scan rate of a liquid crystal panel to correspond to a set scan rate of content received from an external source; and controlling at least one of a timing controller for transmitting a source control signal to a source driver that outputs a grayscale voltage to the liquid crystal panel or a scaler for transmitting image data corresponding to the content to the timing controller, to adjust a data rate of an output signal based on the driving scan rate.

The controlling of the at least one of the timing controller or the scaler includes, controlling the at least one of the timing controller or the scaler to adjust the data rate of the output signal in proportion to the driving scan rate.

The controlling of the at least one of the timing controller or the scaler may include: based on the set scan rate of the content being decreased, controlling the at least one of the timing controller or the scaler to decrease the data rate of the output signal.

The controlling of the at least one of the timing controller or the scaler may include: based on the set scan rate of the content being increased, controlling the at least one of the timing controller or the scaler to increase the data rate of the output signal.

The controlling of the at least one of the timing controller or the scaler may include: controlling the at least one of the timing controller or the scaler to control the data rate of the output signal to be linearly proportional to the driving scan rate.

The controlling of the at least one of the timing controller or the scaler may include: controlling the at least one of the timing controller or the scaler to adjust the data rate of the output signal at each time of the content received from the external source being changed.

The controlling of the at least one of the timing controller or the scaler may include: controlling the at least one of the timing controller or the scaler to adjust the data rate of the output signal based on the driving scan rate in units of preset frame intervals.

The controlling of the at least one of the timing controller or the scaler may include: controlling the at least one of the scaler or the timing controller to adjust the data rate of the output signal based on the driving scan rate in units of preset time intervals.

According to an aspect of the disclosure, a display apparatus includes: a liquid crystal panel; and a controller configured to: adjust a driving scan rate of the liquid crystal panel to correspond to a set scan rate of content received from an external source; and control at least one of a scaler or a timing controller to adjust a data rate of an output signal based on the driving scan rate.

The controller may be further configured to control the at least one of the scaler or the timing controller to adjust the data rate of the output signal in proportion to the driving scan rate.

The controller may be further configured to, based on the set scan rate of the content being decreased, control the at least one of the scaler or the timing controller to decrease the data rate of the output signal.

The controller may be further configured to, based on the set scan rate of the content being increased, control the at least one of the scaler or the timing controller to increase the data rate of the output signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
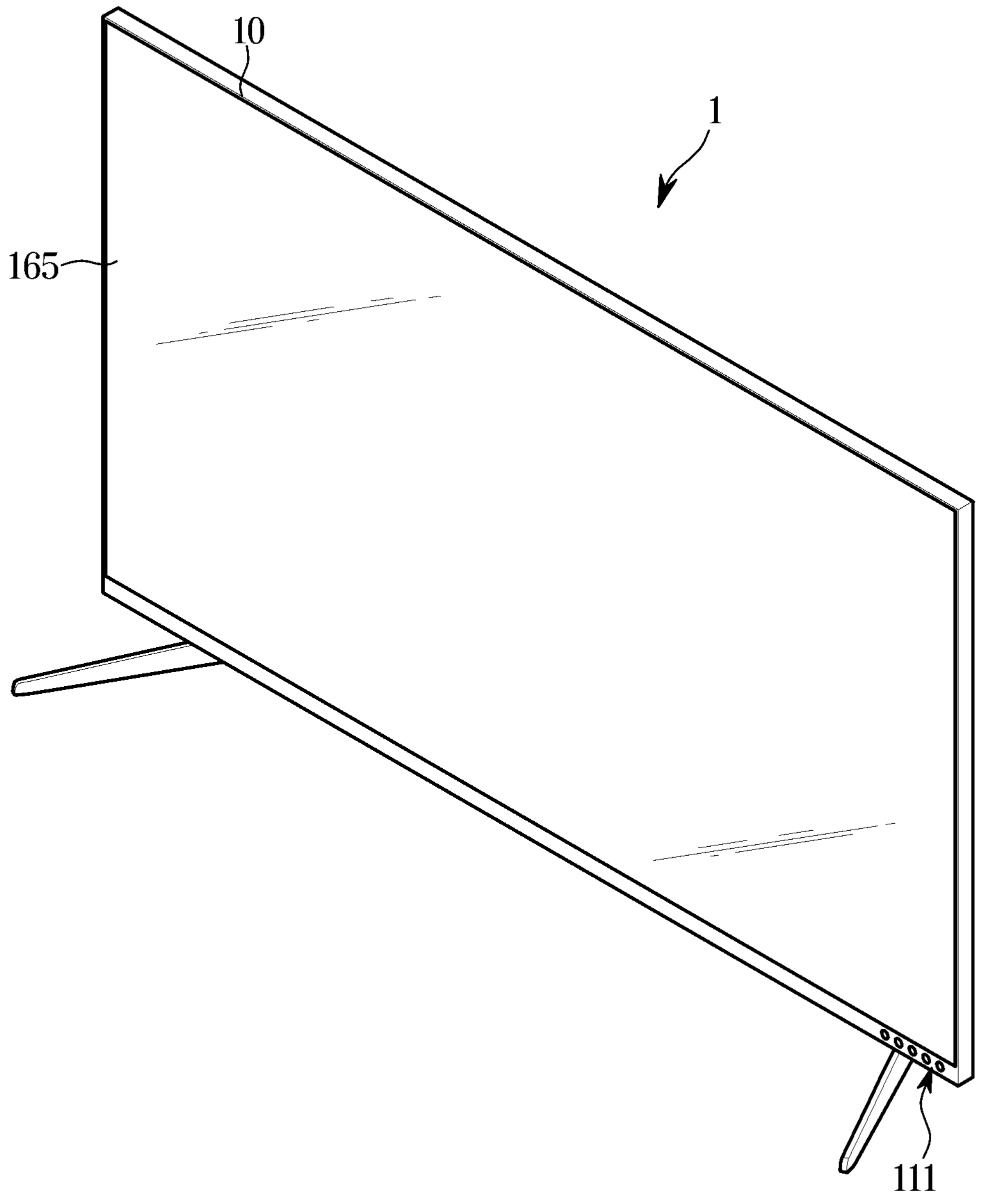
FIG. 1 is an external view illustrating a display apparatus according to an embodiment.

The one or more embodiments described in the disclosure, and the configurations shown in the drawings are only examples, and various modifications may be made to replace the embodiments and drawings of the disclosure.

It will be further understood that the term "connect" or its derivatives refer both to direct and indirect connection, and the indirect connection includes a connection over a wireless communication network.

In addition, the terms used herein are for the purpose of describing the embodiments and are not intended to restrict and/or to limit the disclosure. For example, the singular expressions herein may include plural expressions, unless the context clearly dictates otherwise. In addition, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

The expression "at least one of A or B" indicates only A, only B," or both of A and B.

In addition, it should be understood that, although the terms first, second, etc. may be used herein to describe various components, these components should not be limited by these terms. These terms are only used to distinguish one component from another. For example, without departing from the scope of the disclosure, the first component may be referred to as a second component, and similarly, the second component may in addition be referred to as a first component.

In addition, the terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Hereinafter embodiments according to the disclosure will be described in detail with reference to the accompanying drawings.

FIG. 1 is an external view illustrating a display apparatus according to an embodiment.

Referring to FIG. 1, a display apparatus 1 according to an embodiment is an apparatus for processing an external image signal received from the outside and visually displaying an image.

Referring to FIG. 1, the display apparatus 1 may be implemented as a computer monitor, but embodiments of the display apparatus 1 are not limited thereto. For example, the display apparatus 1 may implement a television (TV), or may be included in a navigation terminal device or various portable terminal devices. The portable terminal device may include a notebook computer, a smart phone, a tablet personal computer (PC), a personal digital assistant (PDA), and the like.

The display apparatus 1 includes a main body 10 that forms the external appearance and accommodates or supports various components constituting the display apparatus 1, and a liquid crystal panel 165 on which an image is displayed.

The main body 10 may be provided with an input button 111 provided to receive a user's command related to power on/off, volume control, channel control, screen mode switching, and the like of the display apparatus 1. In addition, a remote controller may be provided separately from the input button 111 on the main body 10 to receive a user's command related to the control of the display apparatus 1.

The liquid crystal panel 165 displays image data by applying a grayscale voltage to a liquid crystal layer provided with a liquid crystal material, which is injected between two substrates and has an anisotropic permittivity, to adjust the amount of light transmitting through the substrate.

Because the liquid crystal panel 165 may not emit light by itself, the display apparatus 1 may be provided with a back light unit (BLU) that projects backlight onto the liquid crystal panel 165. Accordingly, the display apparatus 1 may adjust the intensity of the grayscale voltage applied to the liquid crystal layer of the liquid crystal panel 165 to adjust the transmittance of the backlight passing through the liquid crystal layer, thereby displaying desired image data.

The backlight unit may be implemented in a direct type or an edge type, and may be implemented in various forms well known to those skilled in the art.

The liquid crystal panel 165 may be composed of pixels. A pixel is a minimum unit constituting a screen displayed through the liquid crystal panel 165, and may also be referred to as a dot or a pixel. Hereinafter, for the sake of convenience of description, the term "pixels" may be used uniformly.

Each pixel may receive an electrical signal representing image data and output an optical signal corresponding to the received electrical signal. As described above, optical signals output from a plurality of pixels included in the liquid crystal panel 165 may be combined so that image data may be displayed on the liquid crystal panel 165.

Each pixel is provided with a pixel electrode and connected to a gate line and a source line. The gate line and the source line may be formed by methods known to those skilled in the art, and detailed descriptions thereof will be omitted.

Hereinafter, each component of the display apparatus 1 will be described in detail, and a method of minimizing power consumption by adjusting a data rate of a digital image signal transmitted between driving elements based on a scan rate of input content will be described.

Figure 2:
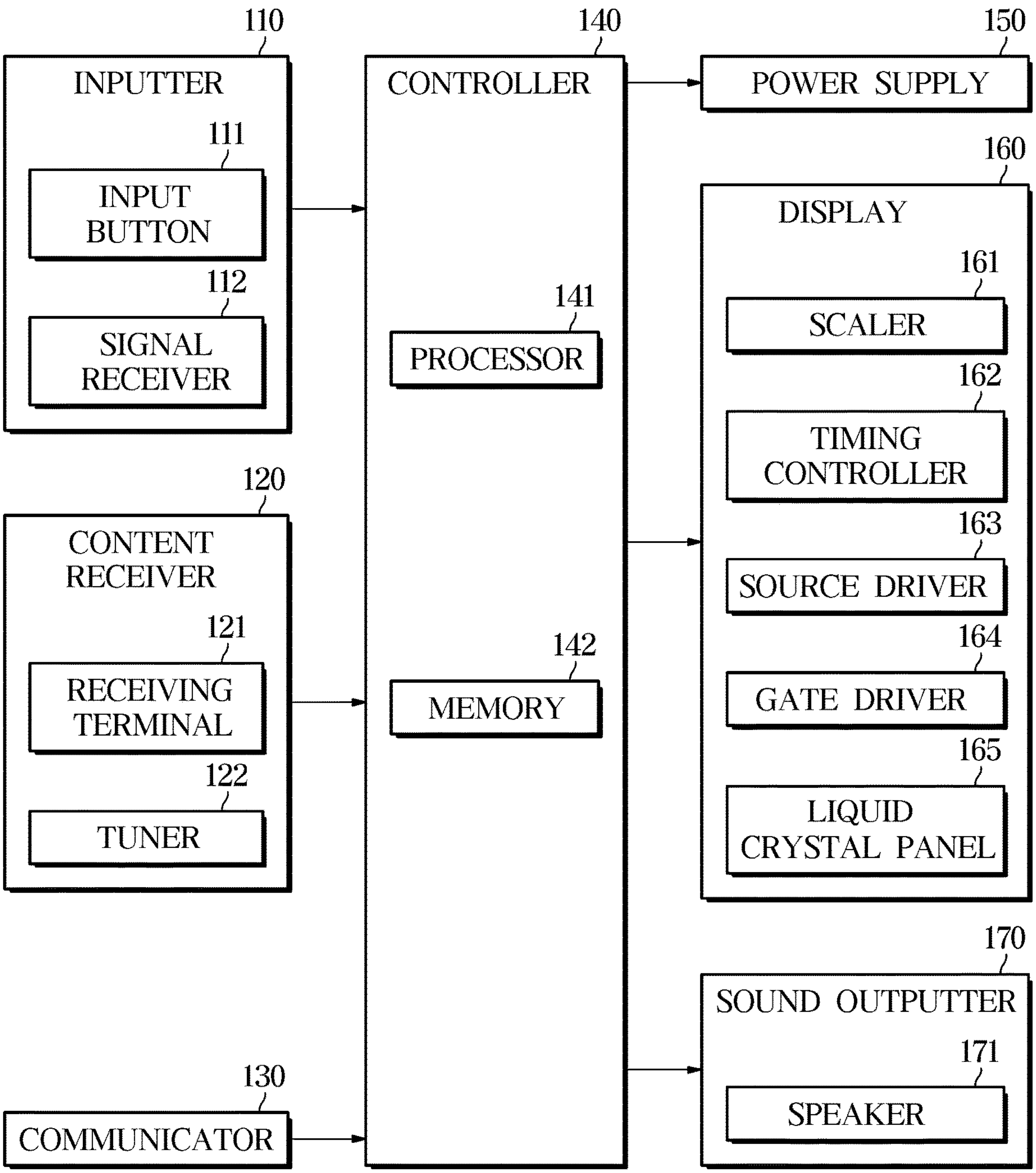
FIG. 2 is a control block diagram illustrating a display apparatus according to an embodiment.
Figure 3:
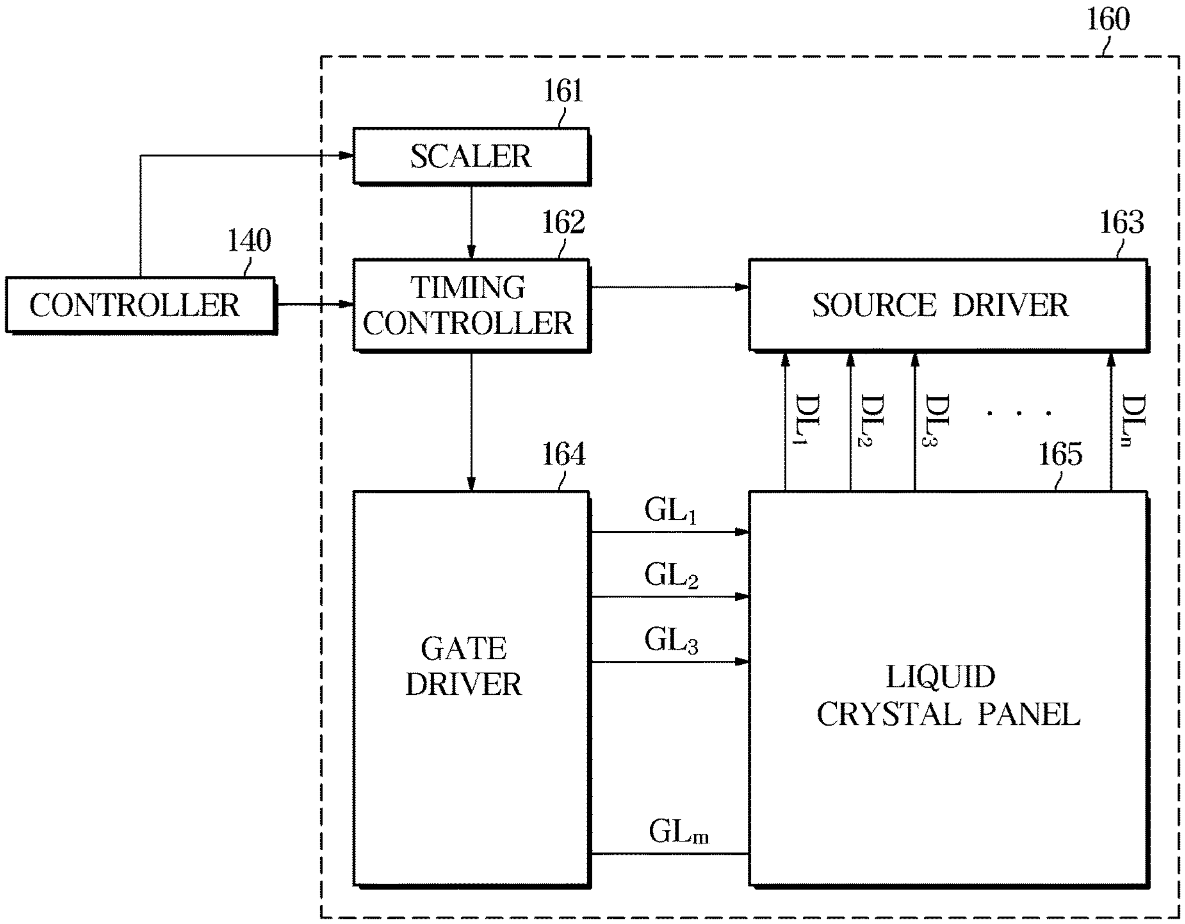
FIG. 3 is a diagram illustrating a control block diagram of a display of a display apparatus according to an embodiment in more detail.

FIG. 2 is a control block diagram illustrating a display apparatus 1 according to an embodiment. FIG. 3 is a diagram illustrating a control block diagram of a display of a display apparatus 1 according to an embodiment in more detail.

Referring to FIG. 2, the display apparatus 1 according to an embodiment includes an inputter 110 that receives various control commands from a user, a content receiver 120 that receives content including video and sound from an external device, a communicator 130 that transmits and receives various data, such as content, through a communication network, a controller 140 that controls a display 160 to display an image based on the image data of the content, a power supply 150 that supplies a voltage to the display 160 according to the control of the controller 140, a display 160 that displays an image under the control of the controller 140, and a sound outputter 170 that outputs sound under the control of the controller 140.

The inputter 110 according to an embodiment may receive various control commands from a user.

For example, the inputter 110 may include an input button 111 as shown in FIG. 2. The input button 111 according to an embodiment may include a power button for turning on/off power of the display apparatus 1, a channel button for changing a communication channel received by the content receiver 120, and a volume button for adjusting the volume of sound output from the audio outputter 170.

On the other hand, various buttons included in the input button 111 may adopt a push switch or a membrane switch that detects a user's pressure, or a touch switch that detects a contact with a part of a user's body. However, it is not limited thereto, and the input button 111 may employ various input devices capable of outputting an electrical signal to the controller 140 in response to a user's specific operation.

In addition, the inputter 110 according to an embodiment may include a signal receiver 112 for receiving a remote control signal of a remote controller.

The remote controller that obtains a user input may be provided separately from the display apparatus 1, and may be configured to obtain a user input and transmit a radio signal corresponding to the user input to the display apparatus 1.

The signal receiver 112 may receive a radio signal from the remote controller and output an electrical signal corresponding to the user input to the controller 140.

In addition, the inputter 110 may include various known components capable of receiving a control command from a user, but is not limited thereto. In addition, when the liquid crystal panel 165 is implemented as a touch screen type, the liquid crystal panel 165 may serve as the inputter 110.

The content receiver 120 according to an embodiment may include a receiving terminal 121 and a tuner 122 for receiving content including a video signal and/or an audio signal from content sources.

The receiving terminal 121 may include an RF coaxial cable connector for receiving a broadcast signal including content from an antenna, a high definition multimedia interface (HDMI) connector for receiving content from a desktop computer, a set-top box, or a multimedia playback device, a component video connector, a composite video connector, a D-sub connector, and the like.

The tuner 122 may receive broadcast signals from a broadcast reception antenna or a wired cable, and extract a broadcast signal of a channel selected by a user from among the broadcast signals. For example, the tuner 122 may pass a broadcast signal having a frequency corresponding to a channel selected by a user among a plurality of broadcast signals received through a broadcast reception antenna or a wired cable, and block broadcast signals having other frequencies.

As described above, the content receiver 120 may receive video signals and audio signals from content sources through the receiving terminal 121 and/or the tuner 122, and output the video signals and/or audio signals to the controller 140.

The communicator 130 according to an embodiment may receive various types of content through wireless communication or wired communication. To this end, the communicator 130 may include a wireless communication module supporting a wireless communication method and a wired communication module supporting a wired communication method.

Wireless communication may include a cellular communication, for example, including at least one of 5th generation (5G), long term evolution (LTE), LTE Advance (LTE-A), code division multiple access (CDMA), wideband code division multiple access (WCDMA), universal mobile telecommunications system (UMTS), wireless broadband internet (WiBro) or global system for mobile communications (GSM). According to one embodiment, wireless communication may include, for example, at least one of, wireless fidelity (WiFi), Bluetooth, Bluetooth Low Energy (BLE), Zigbee, near field communication (NFC), magnetic secure transmission, radio frequency (RF) or a body area network (BAN). According to one embodiment, wireless communication may include global navigation satellite system (GNSS).

In addition, wired communication methods include, peripheral component interconnect (PCI), PCI-express, universe serial bus (USB), and the like, but are not limited thereto.

The controller 140 according to an embodiment may include at least one memory 142 storing a program for performing the above-described operation and an operation described below, and at least one processor 141 executing the stored program.

The processor 141 according to an embodiment may control the content receiver 120, the communicator 130, the power supply 150, the display 160, and the sound outputter 170 based on a control command received from the inputter 110.

The processor 141 according to an embodiment may adjust a driving scan rate of the liquid crystal panel 165 to correspond to a set scan rate of content.

Specifically, the processor 141 may variably adjust the driving scan rate of the liquid crystal panel 165 based on information about the set scan rate of the content received through the content receiver 120 or the communicator 130.

That is, the processor 141 may, upon receiving scan rate information transmitted from a graphic card of a subject (e.g., a desktop computer) that transmits content, control the liquid crystal panel 165 to be driven at a scan rate of the received scan rate information.

For example, the driving scan rate of the liquid crystal panel 165 may be variably adjusted between 60 Hz and 240 Hz. However, the above range is only an example, and the scan rate range may be variable according to embodiments.

The processor 141 according to an embodiment may, upon a driving scan rate being determined, control at least one of the scaler 161 or the timing controller 162 to adjust the data rate of the output signal based on the driving scan rate.

That is, the processor 141 may, upon a driving scan rate being determined based on an input scan rate of content, control at least one of the scaler 161 or the timing controller 162 to adjust the data rate in response to the determined driving scan rate.

With such a configuration, the display apparatus 1 may optimize the clock speed of integrated chip (IC) elements, such as the scaler 161, the timing controller 162, and the source driver 163, according to the driving scan rate, to optimize power consumption.

For example, the processor 141 may control at least one of the scaler 161 or the timing controller 162 to adjust the data rate of the output signal in proportion to the driving scan rate.

That is, the processor 141 may control at least one of the scaler 161 or the timing controller 162 such that the data rate of the output signal decreases in response to the set scan rate of the content being decreased.

Conversely, the processor 141 may control at least one of the scaler 161 or the timing controller 162 such that the data rate of the output signal increases in response to the set scan rate of the content being increased.

According to embodiments, the processor 141 may control at least one of the scaler 161 or the timing controller 162 such that the data rate of the output signal is linearly proportional to the driving scan rate.

In addition, according to embodiments, the processor 141 may control at least one of the scaler 161 or the timing controller 162 to adjust the data rate of the output signal at each time of the content received from the outside being changed.

That is, the processor 141 may, in response to content being changed, identify a set scan rate of the content, determine a driving scan rate of the liquid crystal panel 165 corresponding to the set scan rate, and control at least one of the scaler 161 or the timing controller 162 to adjust the data rate of the output signal based on the determined driving scan rate.

In addition, according to embodiments, the processor 141 may control at least one of the scaler 161 or the timing controller 162 to adjust the data rate of the output signal based on the driving scan rate in units of preset frame intervals.

That is, the processor 141 may identify a set scan rate each time a preset frame interval has elapsed during reproduction of same content to determine a driving scan rate of the liquid crystal panel 165 corresponding to the set scan rate, and control at least one of the scaler 161 or the timing controller 162 to adjust the data rate of the output signal based on the determined driving scan rate.

In addition, according to embodiments, the processor 141 may control at least one of the scaler 161 or the timing controller 162 to adjust the data rate of the output signal based on the driving scan rate in units of preset time intervals.

That is, the processor 141 may identify a set scan rate each time a preset time interval has elapsed during reproduction of same content to determine a driving scan rate of the liquid crystal panel 165 corresponding to the set scan rate, and control at least one of the scaler 161 or the timing controller 162 to adjust the data rate of the output signal based on the determined driving scan rate.

The memory 142 according to an embodiment may store information about a data rate of the scaler 161 and a data rate of the timing controller 162 according to a driving scan rate of the liquid crystal panel 165, and store information about a video signal corresponding to content received from the outside.

As described above, the memory 142 may be implemented as at least one of a volatile memory device, such as a cache, a read only memory (ROM), a programmable ROM (PROM), an erasable programmable ROM (EPROM), an electrically erasable programmable ROM (EEPROM), and a flash memory, or a volatile memory device, such as a random access memory (RAM) to store various types of information. However, it is not limited thereto, and any type capable of storing various types of information may be used as the type of memory 142.

The power supply 150 according to an embodiment may supply a voltage to the display 160.

Specifically, the power supply 150 may supply driving voltages to each of a source driver 163 and a gate driver 164, and may supply a common voltage Vcom required for the liquid crystal layer of the liquid crystal panel 165 through each pixel electrode.

To this end, the power supply 150 may include a DC/DC converter and a pulse width modulation (PWM) driver, and may be provided in the form of a separate integrated circuit (IC) according to an embodiment.

The display 160 according to an embodiment may receive an external image signal from the controller 140 and drive the liquid crystal panel 165 based on the received external image signal to display an image.

To this end, the display 160 may include a source driver 163, a gate driver 164, a timing controller 162 that transmits a gate control signal and a source control signal to control overall operations of the source driver 163 and the gate driver 164, and a scaler 161 that transmits image data corresponding to content to the timing controller 162.

In addition, as shown in FIG. 3, the display 160 may include a liquid crystal panel 165 which includes a plurality of gate lines GL1, GL2, GL3 and GLm transmitting gate signals, a plurality of source lines DL1, DL2, DL3 and DLn transmitting grayscale voltages while intersecting the gate lines GL1, GL2, GL3 and GLm, and includes a plurality of pixel electrodes formed in areas surrounded by the gate lines GL1, GL2, GL3 and GLm and the source lines DL1, DL2, DL3 and DLn and provided in the form of a matrix connected through switching elements serving as switches between the gate lines GL1, GL2, GL3, and GLm and the source lines DL1, DL2, DL3, and DLn.

The switching element may be a thin film transistor (TFT) according to an embodiment, and may be implemented with various elements known to those skilled in the art.

Each of the pixels may rotate liquid crystal molecules of the liquid crystal layer by an electric field between the pixel electrode, to which a grayscale voltage is applied through the thin film transistor, and a common electrode, to which a common voltage Vcom is applied, to control the amount of transmission light, thereby providing image data.

The scaler 161 according to an embodiment may transmit image data corresponding to content received from the outside to the timing controller 162.

Specifically, the scaler 161 may convert the resolution of content received from the outside into a resolution supported by the liquid crystal panel 165 and transmit related image data to the timing controller 162.

For example, the scaler 161 may convert an external video signal of a HDMI or an RF connector into video data of V-by-One HS (Vx1), Low Voltage Differential Signaling (LVDS), or Embedded Display Port (eDP), and transfer the image data to the timing controller 162.

To this end, the scaler 161 may be provided in the form of a separate integrated circuit (IC).

The timing controller 162 according to an embodiment may receive image data including color data and image control signals from the scaler 161. For example, the image control signal may include a vertical sync signal Vsync, a horizontal sync signal Hsync, a main clock MCLK, a data enable signal DE, and the like.

The timing controller 162 may generate a source control signal for controlling the source driver 163 and a gate control signal for controlling the gate driver 164 based on the input image control signal. For example, the timing controller 162 may output the source control signal and the color data to the source driver 163 and output the gate control signal to the gate driver 164.

For example, the timing controller 162 may convert the image data received from the scaler 161 into signals of USI-T, CEDS, or CSPI, and transfer the converted signals into the source driver 163 or the gate driver 164.

To this end, the timing controller 162 may be provided in the form of a separate integrated circuit (IC).

The source driver 163 according to an embodiment may set the output timing of the gray-scale voltage and the size and polarity of the gray-scale voltage according to the source control signal and the color data received from the timing controller 162, and output an appropriate grayscale voltage through the source lines DL1, DL2, DL3, and DLn according to a supply timing.

In addition, the source driver 163 periodically performs inversion driving according to an inversion cycle through a reference inversion signal. For example, the reference inversion signal includes a reverse signal (REV) and a polarity control signal (POL) for inverting polarities of pixel electrodes connected to the source driver.

The source driver 163 may include at least one source driver integrated circuit (IC), and the number of source driver ICs may be determined according to the specifications, such as the size and resolution of the liquid crystal panel 165.

In this case, the source driver 163 may convert image data, which is received from the controller 140 via the scaler 161 and the timing controller 162, to an analog grayscale voltage based on a driving voltage supplied from the power supply 150, and apply the grayscale voltages to each of the source lines DL1, DL2, DL3, and DLn arranged on the liquid crystal panel 165.

The gate driver 164 according to an embodiment may be connected to one end or both ends of the gate lines GL1, GL2, GL3, and GLm, and may generate a plurality of gate signals using a gate control signal provided from the timing controller 162 and gate on/off voltages supplied from the voltage supply 150 and apply the gate signals to the gate lines GL1, GL2, GL3, and GLm arranged on the liquid crystal panel 165.

The gate driver 164 may include at least one gate drive integrated circuit (IC), and the gate drive IC may be determined according to the specifications, such as the size and resolution of the liquid crystal panel 165.

That is, the gate driver IC of the gate driver 164 may receive a gate control signal and sequentially apply on/off voltages, that is, on/off signals through a gate line. Accordingly, the gate driver IC may sequentially turn on/off switching elements connected to the gate line.

Accordingly, color data to be displayed on pixels connected to a gate line is converted into grayscale voltages divided into a plurality of voltages and applied to respective source lines. In this case, the gate signal is sequentially applied to all gate lines during one frame interval such that all pixel rows are supplied with grayscale voltages corresponding to color data, thereby displaying one frame of image on the liquid crystal panel 165.

On the other hand, when an electric field of the same direction, that is, the same polarity, is continuously applied to the pixel electrode of the display apparatus, afterimages may remain due to the nature of the liquid crystal material, and image quality may be lowered. Therefore, a need to drive by inverting the polarity of the grayscale voltage with respect to the common voltage arises.

The polarity is determined to be positive or negative based on the common voltage. For example, when a pixel receives a positive grayscale voltage in one frame, the pixel needs to receive a negative grayscale voltage in another frame. As a result, the polarities of the grayscale voltage applied to a specific pixel needs alternate between a positive polarity and a negative polarity. In this case, the polarities may be inverted sequentially every time the frame changes, may be inverted in a period of a plurality of frames, or may be inverted only in a specific frame, and the like, so there is no limit to the inversion period. Accordingly, the liquid crystal display panel 20 may adopt a driving method, such as dot inversion, in which the polarities are inverted according to an inversion period.

The sound outputter 170 according to an embodiment may receive a sound signal of the content received through the content receiver 120 or the communicator 130 under the control of the processor 141 and output sound. In this case, the sound outputter 170 may include one or more speakers 171 that convert electrical signals into sound signals.

In the above, each component of the display apparatus 1 has been described in detail. Hereinafter, optimization of power consumption by variably adjusting a data rate of a digital signal transmitted between internal ICs based on a scan rate of input content by the display apparatus 1 will be described in detail.

Figure 4:
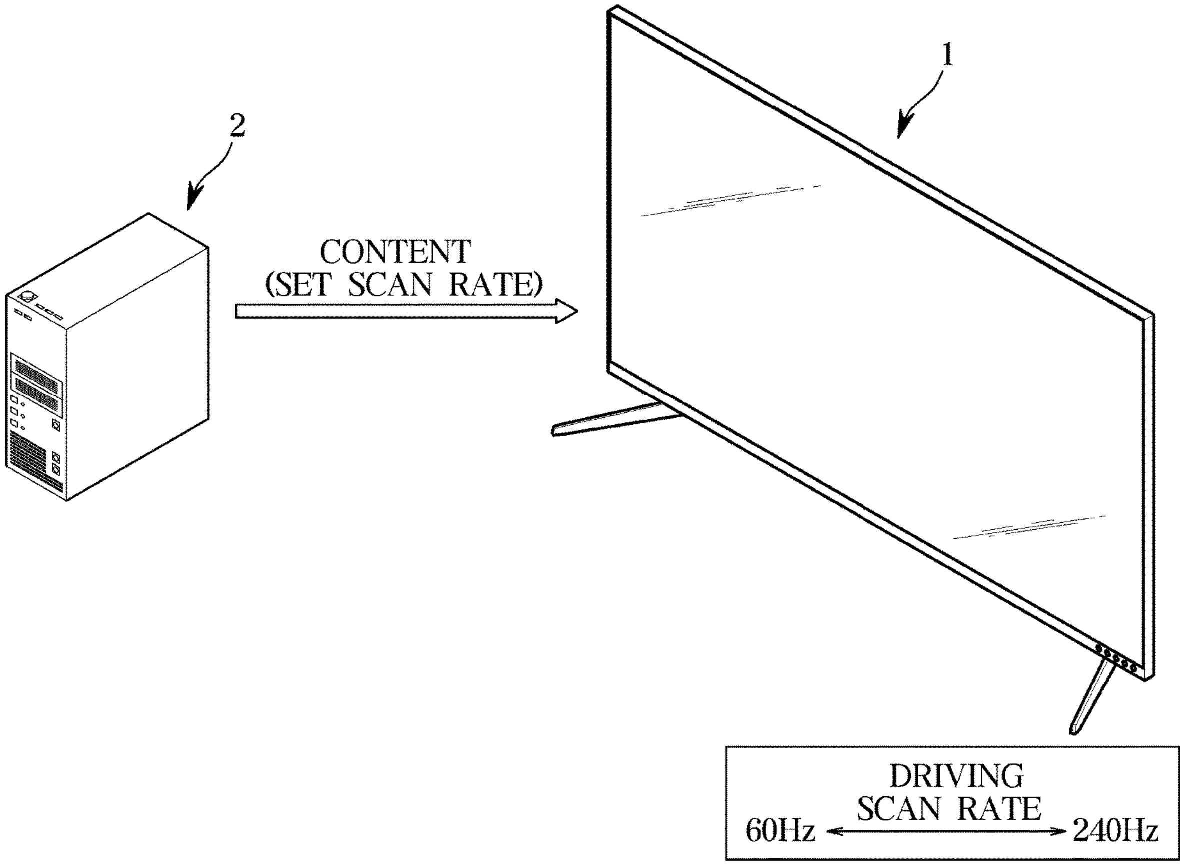
FIG. 4 is a diagram illustrating an example in which a display apparatus according to an embodiment varies a driving scan rate.

FIG. 4 is a diagram illustrating an example in which a display apparatus 1 according to an embodiment varies a driving scan rate.

Referring to FIG. 4, the display apparatus 1 according to an embodiment may adjust a driving scan rate of the liquid crystal panel 165 to correspond to a set scan rate of content.

In detail, the display apparatus 1 may variably adjust the driving scan rate of the liquid crystal panel 165 based on information about a set scan rate of content received through the content receiver 120 or the communicator 130.

That is, as shown in FIG. 4, when the display apparatus 1 receives scan rate information transmitted from a graphic card of a subject (e.g., a desktop computer) 2 that transmits content, the display apparatus 1 may control the liquid crystal panel 165 to be driven at a scan rate of the received scan rate information.

For example, the driving scan rate of the liquid crystal panel 165 may be variably adjusted between 60 Hz and 240 Hz. However, the above range is only an example, and the scan rate range may be variable according to embodiments.

As described above, the display apparatus 1 may adjust the driving scan rate of the liquid crystal panel 165 to correspond to the input scan rate of the content input to the display apparatus 1, thereby providing a user with a scan rate corresponding to the content.

Figure 5:
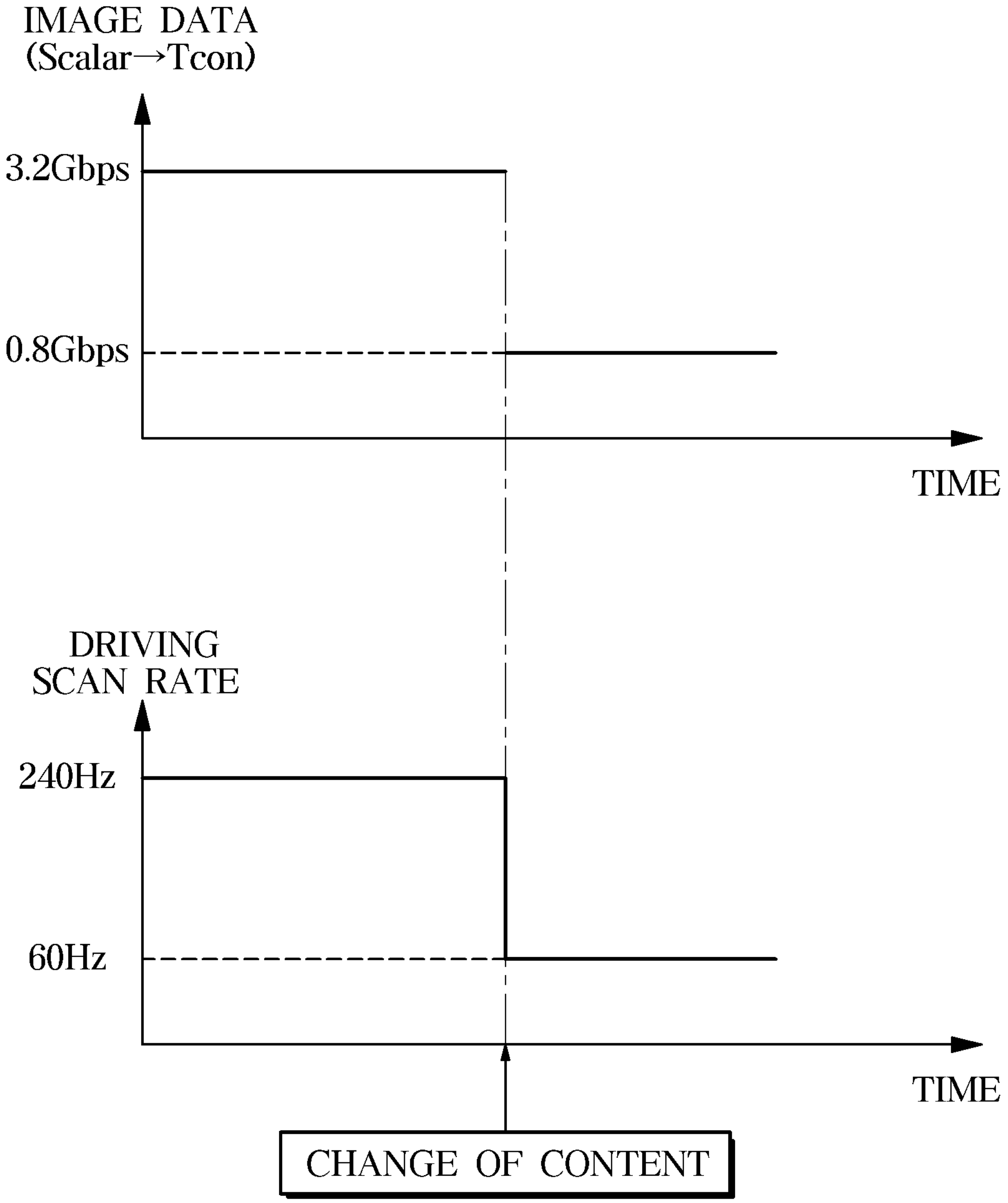
FIG. 5 is a diagram illustrating an example in which a display apparatus according to an embodiment controls a scaler to adjust a data rate of an output signal based on a driving scan rate.
Figure 6:
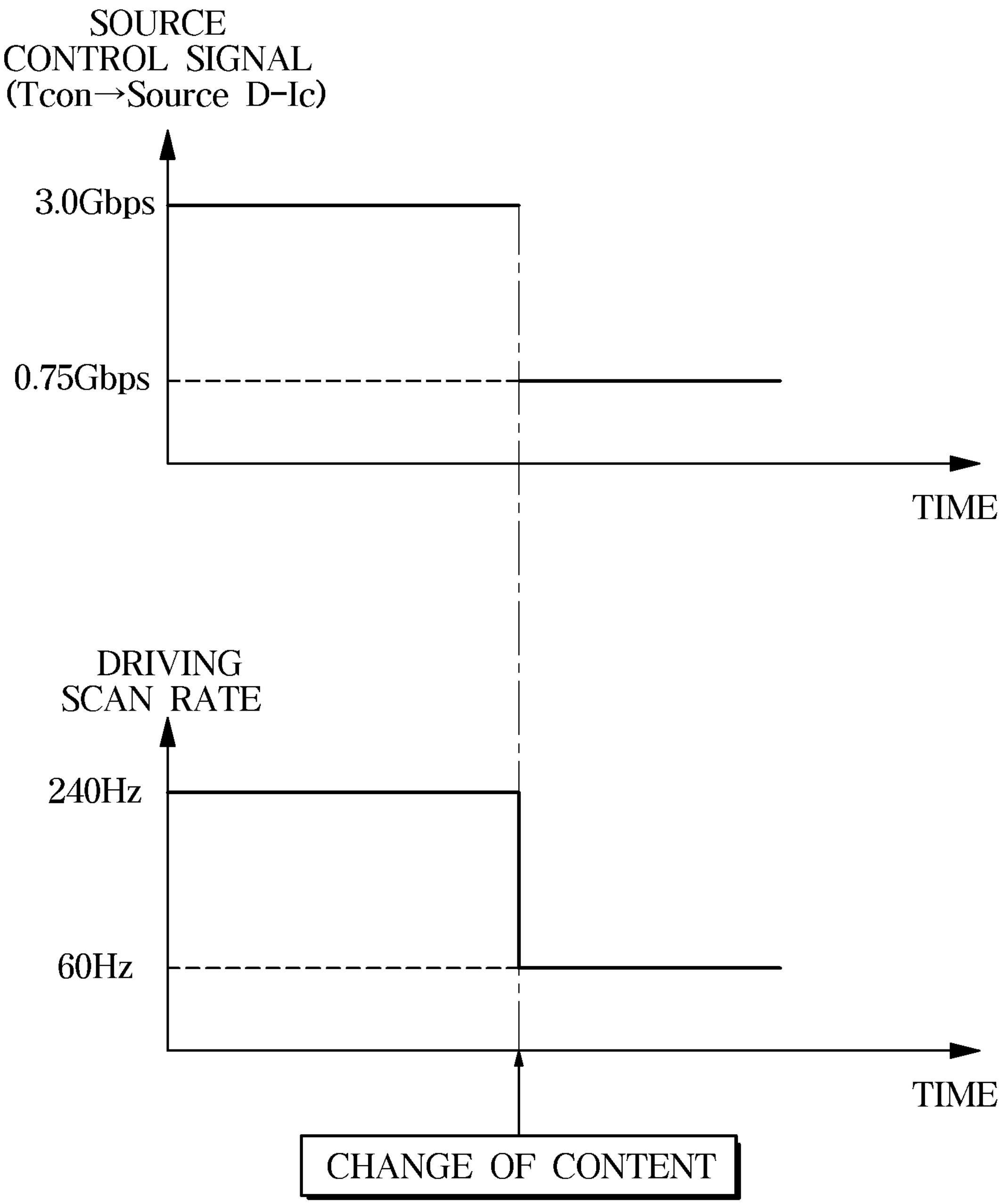
FIG. 6 is a diagram illustrating an example in which a display apparatus according to an embodiment controls a timing controller to adjust a data rate of an output signal based on a driving scan rate.
Figure 7:
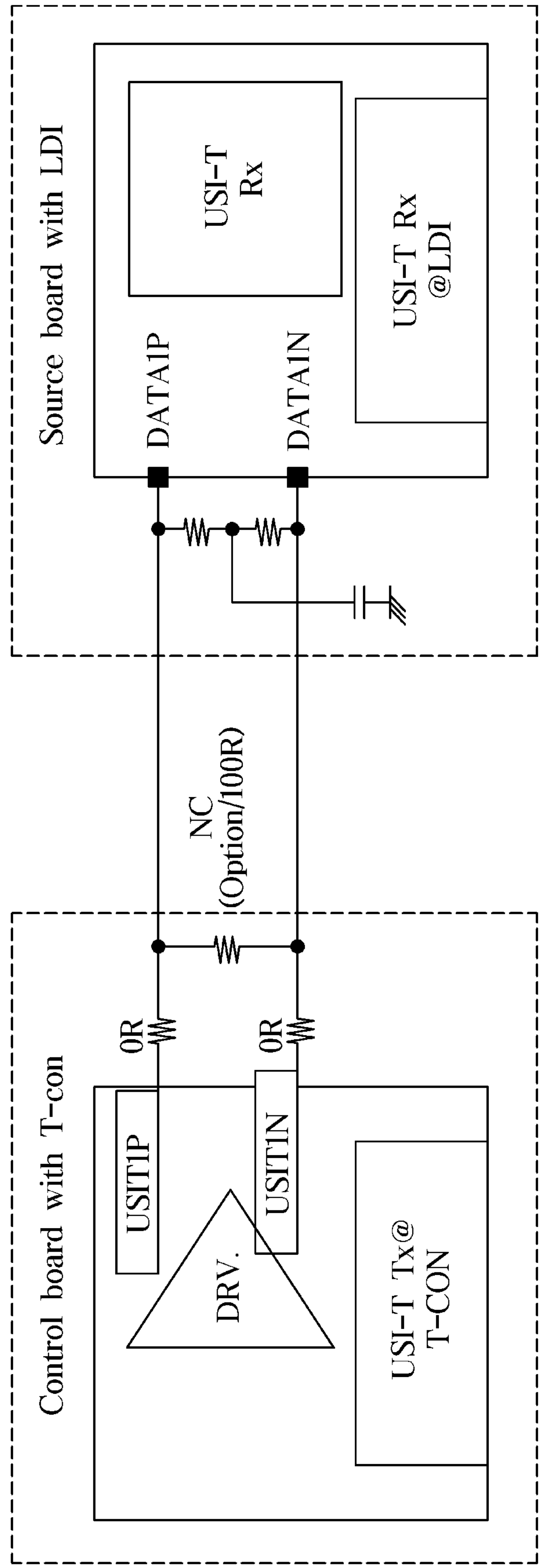
FIG. 7 is a diagram illustrating an effect when a display apparatus according to an embodiment adjusts a data rate of an output signal based on a driving scan rate.

FIG. 5 is a diagram illustrating an example in which a display apparatus 1 according to an embodiment controls a scaler 161 to adjust a data rate of an output signal based on a driving scan rate. FIG. 6 is a diagram illustrating an example in which a display apparatus 1 according to an embodiment controls a timing controller 162 to adjust a data rate of an output signal based on a driving scan rate. FIG. 7 is a diagram illustrating an effect when a display apparatus 1 according to an embodiment adjusts a data rate of an output signal based on a driving scan rate according to an embodiment.

Referring to FIGS. 5 and 6, the display apparatus 1 according to an embodiment may, upon a driving scan rate being determined, control at least one of the scaler 161 or the timing controller 162 to adjust a data rate of the output signal based on the driving scan rate.

That is, the display apparatus 1 may, upon a driving scan rate being determined based on an input scan rate of content, control at least one of the scaler 161 or the timing controller 162 to adjust a data rate in response to the determined driving scan rate.

For example, the display apparatus 1 may control at least one of the scaler 161 or the timing controller 162 to adjust the data rate of the output signal in proportion to the driving scan rate.

That is, the display apparatus 1 may control at least one of the scaler 161 or the timing controller 162 such that the data rate of the output signal decreases in response to the set scan rate of the content being decreased.

Conversely, the display apparatus 1 may control at least one of the scaler 161 or the timing controller 162 such that the data rate of the output signal increases in response to the set scan rate of the content being increased.

Depending on embodiments, the display apparatus 1 may control at least one of the scaler 161 or the timing controller 162 such that the data rate of the output signal is linearly proportional to the driving scan rate.

For example, as shown in FIG. 5, when the content is changed and the driving scan rate is changed from 240 Hz to 60 Hz, the display apparatus 1 may control the scaler 161 to adjust the data rate of the output signal according to a change rate of the driving scan rate.

In this case, the scaler 161 may adjust the data rate of the image data transmitted to the timing controller 162 by a factor of 1/4, from 3.2 Gbps to 0.8 Gbps. In other words, the scaler 161 may perform control such that the data rate of image data corresponding to the output signal decreases by a factor of 1/4 in response to a decrease of the driving scan rate by a factor of 1/4.

In addition, as shown in FIG. 6, when the content is changed and the driving scan rate is changed from 240 Hz to 60 Hz, the display apparatus 1 may control the timing controller 162 to adjust the data rate of the output signal according to a change rate of the driving scan rate.

In this case, the timing controller 162 may adjust the data rate of the image data transmitted to the source driver 163 by a factor of 1/4, from 3.0 Gbps to 0.75 Gbps. In other words, the timing controller 162 may perform control such that the data rate of the source control signal corresponding to the output signal decreases by a factor of 1/4 in response to a decrease of the driving scan rate by a factor of 1/4. Although only the source control signal is described as an example in FIG. 6, the timing controller 162 may also control the data rate of the gate control signal according to embodiments.

As shown in FIGS. 5 and 6, according to embodiments, the display apparatus 1 may control at least one of the scaler 161 or the timing controller 162 to adjust the data rate of the output signal whenever content received from the outside is changed.

That is, in response to content being changed, the display apparatus 1 may identify a set scan rate of the content, determine a driving scan rate of the liquid crystal panel 165 corresponding to the set scan rate, and control at least one of the scaler 161 or the timing controller 162 to adjust the data rate of the output signal based on the determined driving scan rate.

In addition, the display apparatus 1, according to embodiments, may control at least one of the scaler 161 or the timing controller 162 to adjust the data rate of the output signal based on the driving scan rate in units of preset frame intervals.

That is, the display apparatus 1 may identify a set scan rate each time when a preset frame interval has elapsed during reproduction of same content to determine a driving scan rate of the liquid crystal panel 165 corresponding to the set scan rate, and control at least one of the scaler 161 or the timing controller 162 to adjust the data rate of the output signal based on the determined driving scan rate.

In addition, according to embodiments, the display apparatus 1 may control at least one of the scaler 161 or the timing controller 162 to adjust the data rate of the output signal based on the driving scan rate in units of preset time intervals.

That is, the display apparatus 1 may identify a set scan rate each time when a preset time interval has elapsed during reproduction of same content to determine a driving scan rate of the liquid crystal panel 165 corresponding to the set scan rate, and control at least one of the scaler 161 or the timing controller 162 to adjust the data rate of the output signal based on the determined driving scan rate.

With such a configuration, the display apparatus 1 may optimize the clock speed of integrated chip (IC) elements, such as the scaler 161, the timing controller 162, and the source driver 163, according to the driving scan rate, to optimize power consumption.

For example, as shown in FIG. 7, in a situation in which a source control signal of USI-T is transmitted from the timing controller 162 to the source driver 163 of the LCD Driver IC (LDI), when the timing controller 162 lowers the data rate of the source control signal, not only the timing controller 162 (a transmitting entity) but also the source driver 163 (a receiving entity) may have a lowered clock speed, so that the power consumption may be reduced.

As described above, power consumption may be reduced by lowering the data rate of the driving integrated circuits (ICs), such that when the data rate is varied based on a scan rate of 120 Hz, the integrated circuits (ICs) may achieve a 5% or more of power saving compare to a case with a scan rate of 240 Hz, and a significant power saving may be achieved for the entire display apparatus 1.

Hereinafter, an embodiment of a method of controlling a display apparatus 1 according to an aspect will be described. The display apparatus 1 according to the above-described embodiment may be used in the method of controlling the display apparatus 1. Accordingly, the contents described above with reference to FIGS. 1 to 7 may be equally applied to the method of controlling the display apparatus 1.

Figure 8:
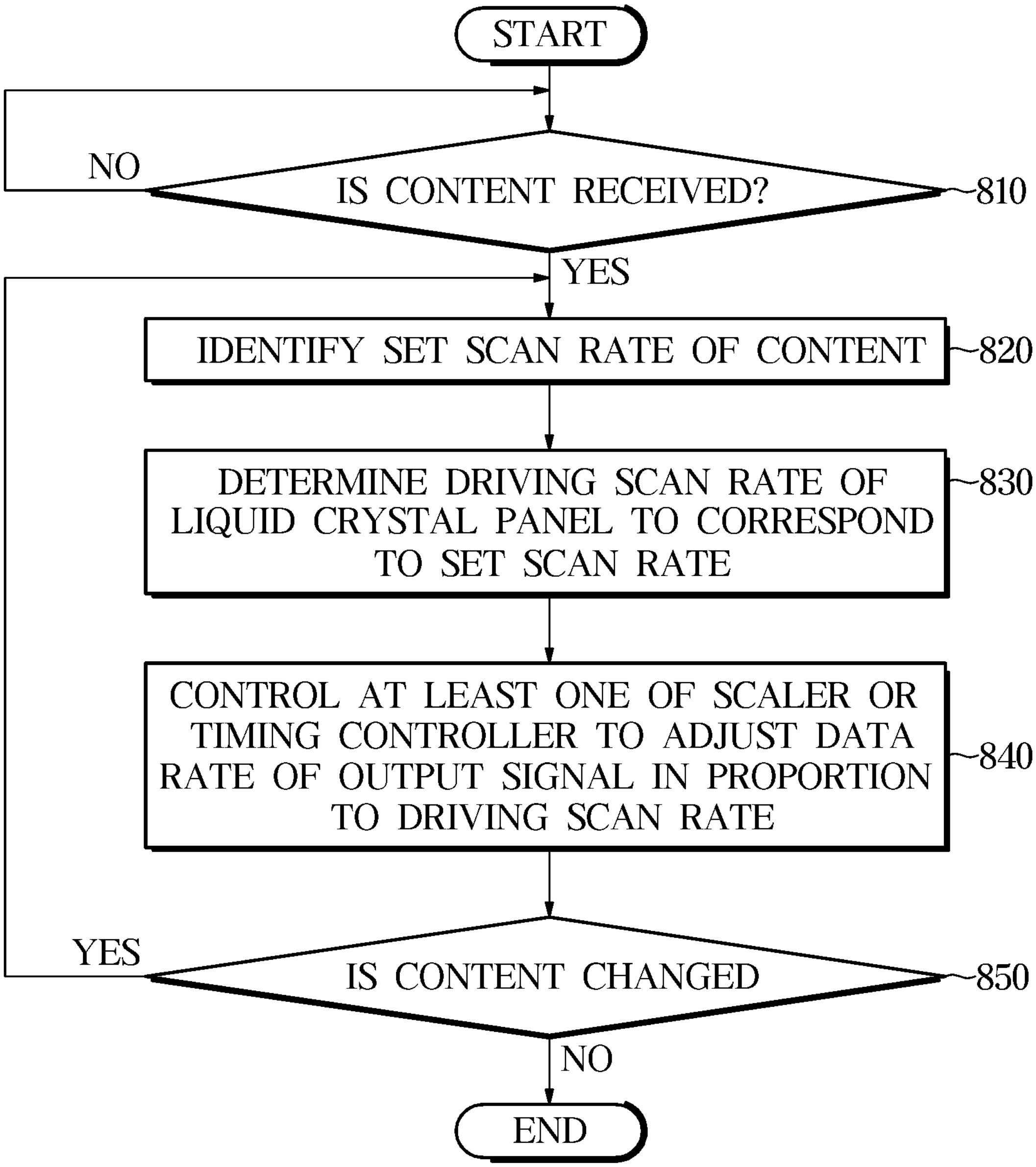
FIG. 8 is a flowchart showing a method of controlling a display apparatus according to an embodiment, which shows an example in which a data rate of an output signal is adjusted based on a driving scan rate.

FIG. 8 is a flowchart showing a method of controlling a display apparatus 1 according to an embodiment, which shows an example in which a data rate of an output signal is adjusted based on a driving scan rate.

Referring to FIG. 8, the display apparatus 1 according to an embodiment may, upon content being received (YES in operation 810), identify a set scan rate of the content (820), and determine a driving scan rate of the liquid crystal panel 165 to correspond to the set scan rate (830).

In detail, the display apparatus 1 may variably adjust the driving scan rate of the liquid crystal panel 165 based on information about the set scan rate of the content received through the content receiver 120 or the communicator 130.

That is, the display apparatus 1 may, upon receiving scan rate information transmitted from a graphic card of a subject (e.g., a desktop computer) 2 that transmits content, control the liquid crystal panel 165 to be driven at a scan rate of the received scan rate information.

For example, the driving scan rate of the liquid crystal panel 165 may be variably adjusted between 60 Hz and 240 Hz. However, the above range is only an example, and the scan rate range may be variable according to embodiments.

As described above, the display apparatus 1 may adjust the driving scan rate of the liquid crystal panel 165 to correspond to the input scan rate of the content input to the display apparatus 1, thereby providing a user with a scan rate corresponding to the content.

The display apparatus 1 according to an embodiment may control at least one of the scaler 161 or the timing controller 162 to adjust the data rate of the output signal in proportion to the driving scan rate (840).

That is, the display apparatus 1 according to an embodiment may, upon a driving scan rate being determined based on an input scan rate of content, control at least one of the scaler 161 or the timing controller 162 to adjust the data rate in response to the determined driving scan rate.

For example, the display apparatus 1 may control at least one of the scaler 161 or the timing controller 162 to adjust the data rate of the output signal in proportion to the driving scan rate.

That is, the display apparatus 1 may control at least one of the scaler 161 or the timing controller 162 such that the data rate of the output signal decreases in response to the set scan rate of the content being decreased.

Conversely, the display apparatus 1 may control at least one of the scaler 161 or the timing controller 162 such that the data rate of the output signal increases in response to the set scan rate of the content being increased.

Depending on embodiments, the display apparatus 1 may control at least one of the scaler 161 or the timing controller 162 such that the data rate of the output signal is linearly proportional to the driving scan rate.

In this case, the display apparatus 1 may, in response to content being changed (YES in operation 850) identify a set scan rate of the content, determine a driving scan rate of the liquid crystal panel 165 to correspond to the set scan rate (830), and control at least one of the scaler 161 or the timing controller 162 again to adjust the data rate of the output signal in proportion to the determined driving scan rate (840).

That is, the display apparatus 1 may, in response to content being changed, identify a set scan rate of the content, determine a driving scan rate of the liquid crystal panel 165 corresponding to the set scan rate, and control at least one of the scaler 161 or the timing controller 162 to adjust the data rate of the output signal based on the determined driving scan rate.

In addition, the display apparatus 1, according to embodiments, may control at least one of the scaler 161 or the timing controller 162 to adjust the data rate of the output signal based on the driving scan rate in units of preset frame intervals.

That is, the display apparatus 1 may identify a set scan rate each time a preset frame period has elapsed during reproduction of same content to determine a driving scan rate of the liquid crystal panel 165 corresponding to the set scan rate, and control at least one of the scaler 161 or the timing controller 162 to adjust the data rate of the output signal based on the determined driving scan rate.

In addition, according to embodiments, the display apparatus 1 may control at least one of the scaler 161 or the timing controller 162 to adjust the data rate of the output signal based on the driving scan rate in units of preset time intervals.

That is, the display apparatus 1 may identify a set scan rate each time a preset time period has elapsed during reproduction of same content to determine a driving scan rate of the liquid crystal panel 165 corresponding to the set scan rate, and control at least one of the scaler 161 or the timing controller 162 to adjust the data rate of the output signal based on the determined driving scan rate.

With such a configuration, the display apparatus 1 may optimize the clock speed of integrated chip (IC) elements, such as the scaler 161, the timing controller 162, and the source driver 163, according to the driving scan rate, to optimize power consumption.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, with the display apparatus according to an embodiment, power consumption can be minimized by adjusting a data rate of a digital image signal transmitted between driving elements according to an input scan rate.

Although embodiments of the disclosure have been described for illustrative purposes, those skilled in the art will appreciate that various modifications, additions and substitutions are possible, without departing from the scope and spirit of the disclosure. Therefore, embodiments of the disclosure have not been described for limiting purposes.

What is claimed is:

1. A display apparatus comprising:
a liquid crystal panel;
a source driver configured to output a grayscale voltage to the liquid crystal panel;
a timing controller configured to transmit a source control signal to the source driver;
a scaler configured to transmit image data corresponding to content received from an external source to the timing controller; and
a controller configured to:
adjust a driving scan rate of the liquid crystal panel to correspond to a set scan rate of the content; and
control at least one of the scaler or the timing controller to adjust a data rate of an output signal at each time of the content received from the external source being changed, based on the driving scan rate.

2. The display apparatus of claim 1, wherein the controller is further configured to control the at least one of the scaler or the timing controller to adjust the data rate of the output signal in proportion to the driving scan rate.

3. The display apparatus of claim 2, wherein the controller is further configured to, based on the set scan rate of the content being decreased, control the at least one of the scaler or the timing controller to decrease the data rate of the output signal.

4. The display apparatus of claim 2, wherein the controller is further configured to, based on the set scan rate of the content being increased, control the at least one of the scaler or the timing controller to increase the data rate of the output signal.

5. The display apparatus of claim 2, wherein the controller is further configured to control the at least one of the scaler or the timing controller to control the data rate of the output signal to be linearly proportional to the driving scan rate.

6. The display apparatus of claim 1, wherein the controller is further configured to control the at least one of the scaler or the timing controller to adjust the data rate of the output signal based on the driving scan rate in units of preset frame intervals.

7. The display apparatus of claim 1, wherein the controller is further configured to control the at least one of the scaler or the timing controller to adjust the data rate of the output signal based on the driving scan rate in units of preset time intervals.

8. A method of controlling a display apparatus, the method comprising:
adjusting a driving scan rate of a liquid crystal panel to correspond to a set scan rate of content received from an external source; and
controlling at least one of a timing controller for transmitting a source control signal to a source driver that outputs a grayscale voltage to the liquid crystal panel or a scaler for transmitting image data corresponding to the content to the timing controller, to adjust a data rate of an output signal at each time of the content received from the external source being changed, based on the driving scan rate.

9. The method of claim 8, wherein the controlling of the at least one of the timing controller or the scaler comprises:
controlling the at least one of the timing controller or the scaler to adjust the data rate of the output signal in proportion to the driving scan rate.

10. The method of claim 9, wherein the controlling of the at least one of the timing controller or the scaler comprises:
based on the set scan rate of the content being decreased, controlling the at least one of the timing controller or the scaler to decrease the data rate of the output signal.

11. The method of claim 9, wherein the controlling of the at least one of the timing controller or the scaler comprises:
based on the set scan rate of the content being increased, controlling the at least one of the timing controller or the scaler to increase the data rate of the output signal.

12. The method of claim 9, wherein the controlling of the at least one of the timing controller or the scaler comprises:
controlling the at least one of the timing controller or the scaler to control the data rate of the output signal to be linearly proportional to the driving scan rate.

13. The method of claim 8, wherein the controlling of the at least one of the timing controller or the scaler comprises:
controlling the at least one of the timing controller or the scaler to adjust the data rate of the output signal based on the driving scan rate in units of preset frame intervals.

14. The method of claim 8, wherein the controlling of the at least one of the timing controller or the scaler comprises:
controlling the at least one of the scaler or the timing controller to adjust the data rate of the output signal based on the driving scan rate in units of preset time intervals.

15. A display apparatus comprising:
a liquid crystal panel; and
a controller configured to:
adjust a driving scan rate of the liquid crystal panel to correspond to a set scan rate of content received from an external source; and
control at least one of a scaler or a timing controller to adjust a data rate of an output signal at each time of the content received from the external source being changed, based on the driving scan rate.

16. The display apparatus of claim 15, wherein the controller is further configured to control the at least one of the scaler or the timing controller to adjust the data rate of the output signal in proportion to the driving scan rate.

17. The display apparatus of claim 16, wherein the controller is further configured to, based on the set scan rate of the content being decreased, control the at least one of the scaler or the timing controller to decrease the data rate of the output signal.

18. The display apparatus of claim 16, wherein the controller is further configured to, based on the set scan rate of the content being increased, control the at least one of the scaler or the timing controller to increase the data rate of the output signal.

* * * * *